(12) United States Patent
Taubmann et al.

(10) Patent No.: US 12,451,253 B2
(45) Date of Patent: Oct. 21, 2025

(54) METHOD AND DATA PROCESSING SYSTEM FOR PROVIDING A STROKE INFORMATION

(71) Applicant: Siemens Healthcare GmbH, Erlangen (DE)

(72) Inventors: Oliver Taubmann, Weilersbach (DE); Alexander Katzmann, Fuerth (DE); Hendrik Ditt, Neustadt an der Aisch (DE); Florian Thamm, Fuerth (DE); Leonhard Rist, Erlangen (DE); Felix Denzinger, Herzogenaurach (DE); Alexander Muehlberg, Nuremberg (DE); Michael Suehling, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 361 days.

(21) Appl. No.: 18/191,624

(22) Filed: Mar. 28, 2023

(65) Prior Publication Data
US 2023/0317289 A1 Oct. 5, 2023

(30) Foreign Application Priority Data
Mar. 31, 2022 (EP) .................................. 22166025

(51) Int. Cl.
*G16H 50/20* (2018.01)
*G06T 7/00* (2017.01)

(52) U.S. Cl.
CPC ........... *G16H 50/20* (2018.01); *G06T 7/0012* (2013.01); *G06T 2207/10081* (2013.01); *G06T 2207/10116* (2013.01); *G06T 2207/30016* (2013.01)

(58) Field of Classification Search
None
See application file for complete search history.

(56) References Cited

U.S. PATENT DOCUMENTS

| | | | |
|---|---|---|---|
| 2010/0195892 A1* | 8/2010 | Sato | G16H 15/00 382/132 |
| 2019/0029557 A1* | 1/2019 | Chen | A61B 5/7264 |

(Continued)

FOREIGN PATENT DOCUMENTS

EP 3798971 A1 3/2021

OTHER PUBLICATIONS

Pawlowski N. et al.:"Deep Structural Causal Models for Tractable Counterfactual Inference." Proceedings of NeurIPS 2020.

(Continued)

*Primary Examiner* — Haris Sabah
(74) *Attorney, Agent, or Firm* — Harness, Dickey & Pierce, P.L.C.

(57) ABSTRACT

One or more example embodiments of the invention relates in one aspect to a computer-implemented method for providing a stroke information. The method includes receiving examination data, the examination data comprising computed tomography imaging data of an examination area of a patient, the examination area of the patient comprising at least one brain region, the at least one brain region being affected by a stroke; adjusting a causal model based on the computed tomography imaging data to obtain an adjusted causal model, wherein the adjusted causal model models a first variable as a first cause for an appearance of the examination area of the patient; receiving a first value for the first variable; generating the stroke information based on the adjusted causal model and the first value for the first variable; and providing the stroke information.

20 Claims, 3 Drawing Sheets

(56) References Cited

U.S. PATENT DOCUMENTS

2021/0321880 A1* 10/2021 Bobo ................... A61B 5/4824
2022/0313191 A1* 10/2022 Goto .................... A61B 6/5205
2022/0395244 A1   12/2022 Taubmann et al.

OTHER PUBLICATIONS

Sumedha Singla et al: "Explaining the Black-box Smoothly—A Counterfactual Approach", arxiv.org, Cornell University Library, 201 Olin Library Cornell University Ithaca, NY 14853, Jan. 12, 2021 (Jan. 12, 2021), XP081856926; 2021.
Nick Pawlowski et al: "Deep Structural Causal Models for Tractable Counterfactual Inference", arxiv.org, Cornell University Library, 201 Olin Library Cornell University Ithaca, NY 14853, Oct. 22, 2020 (Oct. 22, 2020), XP081795707; 2020.

* cited by examiner

METHOD AND DATA PROCESSING SYSTEM FOR PROVIDING A STROKE INFORMATION

CROSS-REFERENCE TO RELATED APPLICATION(S)

The present application claims priority under 35 U.S.C. § 119 to European Patent Application No. 22166025.1, filed Mar. 31, 2022, the entire contents of which are incorporated herein by reference.

FIELD

One or more example embodiments of the invention relates to a computer-implemented method for providing a stroke information. In other aspects, one or more example embodiments of the invention relates to a data processing system, to a computed tomography device, to a computer program product and to a computer-readable storage medium.

RELATED ART

When diagnosing patients suffering from acute ischemic stroke, the onset time is clinically crucial information determining the most promising treatment choice. This is because longer times-to-treatment are generally associated with worse outcomes, thus reducing the expected risk-to-benefit ratio of common therapeutic measures. Unfortunately, the onset time is not always known and may need to be estimated. As one option, this may be done based on, e.g., computed tomography (CT) or magnetic resonance (MR) imaging, and thus also constitutes a task potentially suitable for automation using learning-based methods. A typical learning-based regression model could yield an estimated time and may provide confidence scores and/or saliency/attention maps highlighting decision-relevant regions in the input. Typically no further explanation is available, in-depth investigation is unfeasible and there is little to provide clinical intuition about the result for the end user.

In a similar fashion, considering the opposite temporal direction, it would be useful to obtain a prediction of the expected short-term progression given the currently available information—again in a way that is easily recognized by a radiologist or clinician.

Manual or semi-automatic estimation of onset time based on quantitative measurements performed within the images is known and can provide some measure of explanation based on the physical models behind the calculation. E.g., a water uptake can be estimated based on a density loss derived from reduced HU values. The water uptake can in turn be linked to the onset time by the average speed of water uptake as a result of infarction.

SUMMARY

However, these methods are limited to those specific static models and do not provide any further visual intuition.

One or more example embodiments facilitate an assessment of stroke that is improved with regard to intuitive exploration and validity checking by a clinical user. This subject matter is set forth in at least the independent claims and the dependent claims.

BRIEF DESCRIPTION OF THE DRAWINGS

Reference is made to the fact that the described methods and the described systems are merely preferred example embodiments of the invention, and that the invention can be varied by a person skilled in the art, without departing from the scope of the invention as it is specified by the claims.

The invention will be illustrated below with reference to the accompanying figures using example embodiments. The illustration in the figures is schematic and highly simplified and not necessarily to scale.

DETAILED DESCRIPTION

Figure 1:
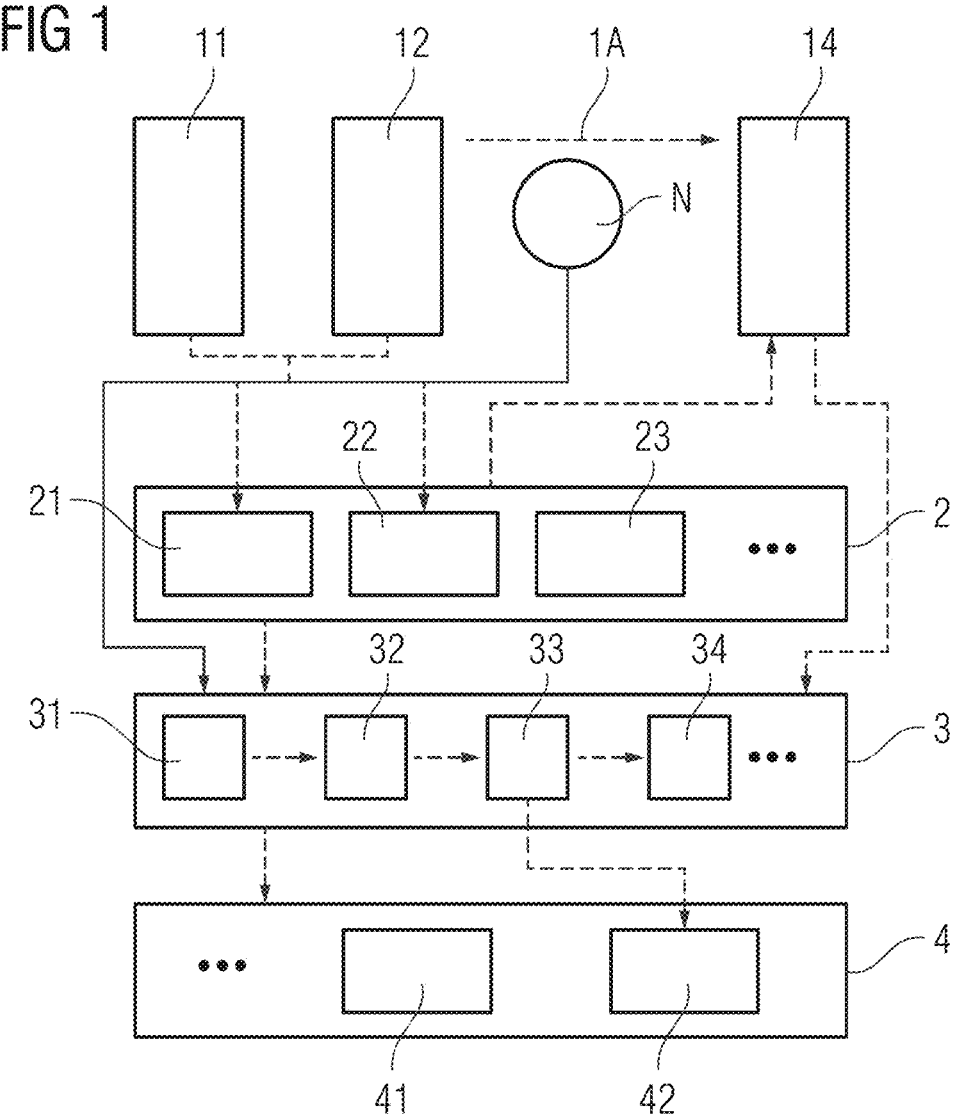
FIG. 1 shows an exemplary template for causal graphs representing an adjusted causal model.

One or more example embodiments of the invention relates in one aspect to a computer-implemented method for providing a stroke information, the method comprising:

Receiving examination data, the examination data comprising computed tomography imaging data of an examination area of a patient, the examination area of the patient comprising at least one brain region, the at least one brain region being affected by a stroke, Adjusting a causal model based on the computed tomography imaging data, thereby obtaining an adjusted causal model, wherein the adjusted causal model models a first variable as a first cause for an appearance of the examination area of the patient, Receiving a first value for the first variable, Generating the stroke information based on the adjusted causal model and the first value for the first variable, Providing the stroke information.

Causal models allow to model causal relationships between multiple variables. They can be typically visualized as graphs. They can not only be used to predict values for unobserved variables, but also to create so-called counterfactuals: what would the outcome be if a certain variable was "retrospectively" set to a specific value? This is referred to as an intervention.

N. Pawlowski, D. Coelho de Castro, B. Glocker, Deep Structural Causal Models for Tractable Counterfactual Inference, Proceedings of NeurIPS 2020, describe causal models that have been extended to tractably include images among the variables in such a graph by using deep generative models that link the image space to a low-dimensional embedding. Such a trained deep structural causal model can create counterfactual images based on interventions regarding demographic/clinical parameters. The variables are the image, age, sex, brain volume and ventricle volume. Counterfactual images can be created by performing so-called interventions on the graph, such as virtually changing the sex of the patient.

The first variable may be a time information regarding an onset time of the stroke. The time information regarding the onset time of the stroke may be the time elapsed since the onset of the stroke.

Performing interventions regarding the onset time on such a causal model would allow users to inspect the model-predicted, patient-specific effects of the stroke-induced ischemia over time. This would allow simple, intuitive validity checks and insights such as: "Does turning back for at least the (known or estimated) onset time remove all signs of infarction in the image as it should?", "Is the gradual growth of the infarct core during given time periods projected to happen at a reasonable pace?", "Is the model's prediction for the degree of deterioration within the coming hour in line with my expectations?".

The adjusted causal model may model a second variable as a second cause for the appearance of the examination area of the patient, wherein the second variable is selected from the group consisting of demographic information regarding the patient, non-imaging-based diagnostic information regarding the patient, medical image information, therapeutic information regarding a therapy of the stroke and combinations thereof, wherein a first value for the second variable is received, wherein the stroke information is generated further based on the first value for the second variable. The examination data may further comprise an actual value for the first variable and/or an actual value for the second variable. The causal model may be adjusted further based on the actual value for the first variable and/or on the actual value for the second variable.

Interventions may also be performed on other variables in the graph to generate additional counterfactuals for reference, in addition to modifying the temporal axis. Ideally, further variables could be considered jointly in form of the second variable, if available, to enhance the causal model's explanatory power. The demographic information, in particular general demographic information, regarding the patient may comprise, for example, information regarding age, sex and/or further causes for image appearance. The non-imaging-based diagnostic information regarding the patient may comprise, for example, lab values, and/or NIHSS information.

The medical image information may comprise, for example, a non-contrast CT (NCCT) image, a CT angiography (CTA) image, a CT perfusion (CTP) image, a perfusion map and combinations thereof. The therapeutic information regarding a therapy of the stroke may comprise, for example, information regarding a therapeutic measure that is under consideration, for example, lysis and/or thrombectomy. Thus different treatment options can be rated with respect to their expected outcome based on the respective counterfactual images.

The adjusted causal model may model an image-derived information as an effect of the first variable and/or second variable and as an intermediate cause for the appearance of the examination area of the patient, wherein a value for the image-derived information is calculated by applying the adjusted causal model onto the first value for the first variable and/or onto the first value of the second variable, wherein the stroke information is generated further based on the calculated value for the image-derived information, in particular, by applying the adjusted causal model onto the calculated value for the image-derived information. An actual value for the image-derived information may be comprised in the examination data and/or may be derived from the computed tomography imaging data. The causal model may be adjusted further based on the actual value for the image-derived information.

The image-derived information may comprise, for example, an infarct core size and/or a penumbra volume and/or a site of occlusion. The infarct core size can be modeled, for example, as a cause for the appearance of the examination area and as an effect of the onset time. The site of occlusion can be modeled, for example, as a cause for the appearance of the examination area as well as for the infarct core size. Similarly, the medical image information may be modeled, by the adjusted causal model, as an effect of the demographic information regarding the patient and/or of the non-imaging-based diagnostic information regarding the patient The adjusted causal model may model the first variable as the first cause for the appearance of the examination area of the patient according to a first medical imaging technique. The adjusted causal model may model the appearance of the examination area of the patient according to the first medical imaging technique as a cause for the appearance of the examination area of the patient according to a second medical imaging technique. The first medical imaging technique may be, for example, a first computed tomography medical imaging technique. The second medical imaging technique may be, for example, a second computed tomography medical imaging technique.

Different imaging techniques may be used, depending on the specific clinical case. Several of them may be included in a single causal model.

In one example, the first medical imaging technique is non-contrast computed tomography (NCCT) and the second medical imaging technique is CT angiography (CTA) and/or CT perfusion (CTP). In another example, the first medical imaging technique is CTA, and the second medical imaging technique is CTP. In another example, the first medical imaging technique is CTP, and the second medical imaging technique is a perfusion map. If the computed tomography imaging data comprise dual energy and/or spectral acquisitions, any derived results, for example iodine maps and/or XMAP, may similarly be investigated along the temporal domain given sufficient training data.

The first counterfactual medical image of the examination area of the patient may be generated by applying the adjusted causal model onto the first value for the first variable and/or onto the first value for the second variable, wherein the stroke information comprises the first counterfactual medical image and/or is generated based on the first counterfactual medical image. The first counterfactual medical image may represent the appearance of the examination area of the patient, in particular, according to the first medical imaging technique and/or according to the second medical imaging technique. The second counterfactual medical image may represent the appearance of the examination area of the patient, in particular, according to the first medical imaging technique and/or according to the second medical imaging technique.

To more thoroughly ensure that the produced counterfactual images closely resemble the original scan, for example the actual medical image of the examination area of the patient, also in non-pertinent image characteristics (e.g., noise structure) and only differ in aspects immediately relevant to the (causal) intervention, strategies inspired by those commonly used in (Cycle) GANs may be beneficial. In one example, an identity constraint may ensure that transforming to the low-dimensional embedding and back preserves an image as accurately as possible. In another example a fake-vs.-real discriminator network and/or loss function operating in an image domain can be used to encourage the generator to produce highly realistic images. Another option is to generate only difference/residual images, which serves to both reduce the complexity of the output space the model needs to produce as well as to preserve the original image characteristics as these would be added on top of the residual image to obtain the final result.

A second value for the first variable and/or a second value for the second variable may be received, wherein a second counterfactual medical image of the examination area of the patient is generated by applying the adjusted causal model onto the second value for the first variable and/or onto the second value for the second variable, wherein the stroke information comprises the second counterfactual medical image and/or is generated further based on the second counterfactual medical image. The second value for the first variable may be different from the first value for the first variable. The second value for the second variable may be different from the first value for the first variable.

A difference map may be calculated based on the first counterfactual medical image and the second counterfactual medical image, wherein the stroke information comprises the difference map and/or is generated further based on the difference map. The difference map may be, for example, a density difference map. The stroke information may be generated, for example, based on an overlay, in particular a color-coded overlay, of the difference map on top of a reference image. The reference image may be the second counterfactual medical image if the difference map is calculated by subtracting the second counterfactual medical image from the first counterfactual medical image. The reference image may be the first counterfactual medical image if the difference map is calculated by subtracting the first counterfactual medical image from the second counterfactual medical image.

Differences between time points may be visualized as color-coded overlays on the scan to visualize temporal changes (e.g. infarct core growth) directly in a single image.

The examination data, in particular the computed tomography imaging data, may comprise an actual medical image of the examination area of the patient, wherein an estimated value for the first variable is determined based on the first value for the first variable, the second value for the first variable, the first counterfactual medical image, the second counterfactual medical image and the actual medical image, for example, by applying an interpolation and/or extrapolation, wherein the stroke information comprises the estimated value for the first variable and/or is generated further based on the estimated value for the first variable. The estimated value for the first variable may be determined, for example, as an estimate of an actual value for the first variable, wherein, according to the adjusted causal model, the actual value for the first variable causes the examination area of the patient to appear as in the actual medical image of the examination area of the patient.

An estimated value for the second variable may be determined based on the first value for the second variable, the second value for the second variable, the first counterfactual medical image, the second counterfactual medical image and the actual medical image, for example, by applying an interpolation and/or extrapolation, wherein the stroke information comprises the estimated value for the second variable and/or is generated further based on the estimated value for the second variable. The estimated value for the second variable may be determined, for example, as an estimate of an actual value for the second variable, wherein, according to the adjusted causal model, the actual value for the second variable causes the examination area of the patient to appear as in the actual medical image of the examination area of the patient.

A difference map can be calculated based on the first counterfactual medical image and the actual medical image and/or based on the second counterfactual medical image and the actual medical image, in particular, as described above for the difference map calculated based on the first counterfactual medical image and the second counterfactual medical image.

When no (clinically or algorithmically) estimated onset time is available, the causal model itself can be used to probabilistically infer a likely onset time from the given observations. To further refine such an estimate, counterfactual images could be created by performing interventions for multiple time points in the vicinity of the estimate and compare them to the real scan—the generated image that exhibits the least discrepancies could then be assumed to correspond to the most accurate onset time estimate.

The first value for the first variable may be a first time point after the onset of the stroke. The second value for the first variable may be a second time point after the onset of the stroke. The estimated value for the time information may be an estimate of the time elapsed between the onset of the stroke and the acquisition of the computed tomography imaging data of the examination area of the patient.

An additional option for automatic verification and quantification is to run algorithms that are able to classify healthy subjects vs. those suffering from stroke and/or rate the stroke severity on the generated images. Such algorithms could then track the results quantitatively in a reproducible manner. For instance, an automatic ASPECT scoring algorithm may run on the images generated for consecutive points in time might continually decrease from 10 (no signs visible yet) to the final score as the signs in all affected regions are becoming increasingly recognizable. The results could be displayed alongside the images on a temporal axis to indicate the progression of stroke signs in terms of standardized clinical scores.

Presentation-wise, a "slider" element may be used to interactively navigate the temporal axis, thereby manually selecting the first time point after the onset of the stroke and/or the second time point after the onset of the stroke, with a live update of the images, and/or images may be precomputed at certain time intervals and arranged for display accordingly.

The causal modal may be a deep structural causal model. The causal model may be based, in particular, trained, on a plurality of training datasets, each training dataset of the plurality of training datasets comprising computed tomography stroke imaging data and a respective value for the first variable. Each training dataset of the plurality of training datasets may further comprise a respective value for the second variable and/or a respective value for the image-derived information. The plurality of training datasets may comprise training datasets from a large number of patients. Based on the examination data of a patient, the causal model can be adjusted specifically to that patient.

One or more example embodiments of the invention relates to a data processing system, comprising a data interface and a processor, the data processing system being configured for carrying out a method according to one or more example embodiments of the invention.

One or more example embodiments of the invention relates to a computed tomography device comprising the data processing system. The computed tomography device may be configured for the acquisition of the computed tomography imaging data of the examination area of the patient.

One or more example embodiments of the invention relates to a computer program product or a computer-readable storage medium, comprising instructions which, when the instructions are executed by a computer, cause the computer to carry out the method according to one or more example embodiments of the invention.

Using a causal model as suggested ensures clinical meaningfulness in contrast to associative learning. The complete proposed approach makes allows proper incorporation of various stroke-relevant parameters. Having the possibility, given a brain scan as well as pertinent clinical information, to virtually "turn back" or "advance" time since onset and observe the estimated patient-specific effects directly in the images would appear to satisfy these needs. Based on the adjusted causal model, the clinical user may explore, how the patient's brain would have looked like or will it look like 0 h, 1 h, 2 h, ..., 6 h after the onset of the stroke and check, whether this in line with the current observation and the corresponding (clinically determined or model-predicted) onset time.

The method allows a flexible, learning-based onset time estimation and short-term outcome prediction that not only incorporates both imaging and non-imaging-based information, but also uniquely offers intuitive exploration and explanation of the results in the "language" radiologists know best—clinical images, synthetically generated for any time point according to the model's interpretation of the case. The causal model combined with generative deep learning models can be used to incorporate, among others, both the onset time as a temporal causal variable as well as result variables representing the image space results, allowing to synthetize images specifically tailored to the patient at other time points which are not directly observable, and thus to foster a better case understanding in terms of precision medicine. This allows a more comprehensive assessment of stroke cases. In particular, the onset time and pre-generated images and/or overlays could be displayed as part of the result portfolio.

Any of the algorithms and/or models mentioned herein can be based on one or more of the following architectures: deep convolutional neural network, deep belief network, random forest, deep residual learning, deep reinforcement learning, recurrent neural network, Siamese network, generative adversarial network or auto-encoder.

The computer program product can be, for example, a computer program or comprise another element apart from the computer program. This other element can be hardware, for example a memory device, on which the computer program is stored, a hardware key for using the computer program and the like, and/or software, for example, a documentation or a software key for using the computer program. A computer-readable storage medium can be embodied as non-permanent main memory (e.g. random-access memory) or as permanent mass storage (e.g. hard disk, USB stick, SD card, solid state disk).

The data processing system can comprise, for example, at least one of a cloud-computing system, a distributed computing system, a computer network, a computer, a tablet computer, a smartphone or the like. The data processing system can comprise hardware and/or software. The hardware can be, for example, a processor system, a memory system and combinations thereof. The hardware can be configurable by the software and/or be operable by the software. Calculations for performing an action of a method may be carried out in the processor.

Data, in particular each of the examination data, the first value of the first variable, the first value of the second variable, the second value of the first variable and the second value of the second variable, can be received, for example, by receiving a signal that carries the data and/or by reading the data from a computer memory and/or by a manual user input, for example, through a graphical user interface. Data, in particular the stroke information, can be provided, for example, by transmitting a signal that carries the data and/or by writing the data into a computer memory and/or by displaying the data on a display.

In the context of the present invention, the expression "based on" can in particular be understood as meaning "using, inter alia". In particular, wording according to which a first feature is calculated (or generated, determined etc.) based on a second feature does not preclude the possibility of the first feature being calculated (or generated, determined etc.) based on a third feature.

FIG. 1 shows an exemplary template for causal graphs representing an adjusted causal model. The first variable is a time information N regarding an onset time of the stroke. The adjusted causal model models a second variable as a second cause for the appearance of the examination area of the patient, wherein the second variable is selected from the group consisting of demographic information 11 regarding the patient, non-imaging-based diagnostic information 12 regarding the patient, medical image information 3, therapeutic information 14 regarding a therapy of the stroke and combinations thereof, wherein a first value for the second variable is received, wherein the stroke information is generated further based on the first value for the second variable.

The adjusted causal model models an image-derived information 2 as an effect of the first variable and as an intermediate cause for the appearance of the examination area of the patient, wherein a value for the image-derived information 2 is calculated by applying the adjusted causal model onto the first value for the first variable, wherein the stroke information is generated further based on the value for the image-derived information 2.

In this example, the most essential interaction considered is that of the time information N regarding the onset time of the stroke on the appearance of the examination area of the patient according to non-contrast computed tomography 31. Further (but not all) possible causal relationships are indicated with dashed arrows. They do not constitute the only sensible way to view cause and effect. For instance, the image-derived information 2 might also be considered an effect of the medical image information 3. The depicted direction of causation can be used to model the influence of the infarct core volume 21 (which of course exists independently of whether it is quantified from the image) on the image appearance through interventions. Arrows from/to whole groups (large boxes) signify that relationships between subsets of the variables in both groups are meant without specifying the details of such interactions, these are left to concrete applications.

The image-derived information 2 comprises an infarct core volume 21, a penumbra volume 22 and/or a site of occlusion 23. The medical image information 3 comprises a non-contrast CT (NCCT) image 31, a CT angiography (CTA) image 32, a CT perfusion (CTP) image 33 and/or a follow-up NCCT image 34 (for example, 24 hours after the onset of the stroke and/or after treatment). The derived medical image information 4 comprises dual-energy and/or spectral imaging results 41 and/or perfusion maps 42. The arrow 1A indicates that the demographic information 11 regarding the patient and/or the non-imaging-based diagnostic information 12 can be modeled, by the adjusted causal model, as a cause for the therapeutic information 14 regarding a therapy of the stroke.

Figure 2:
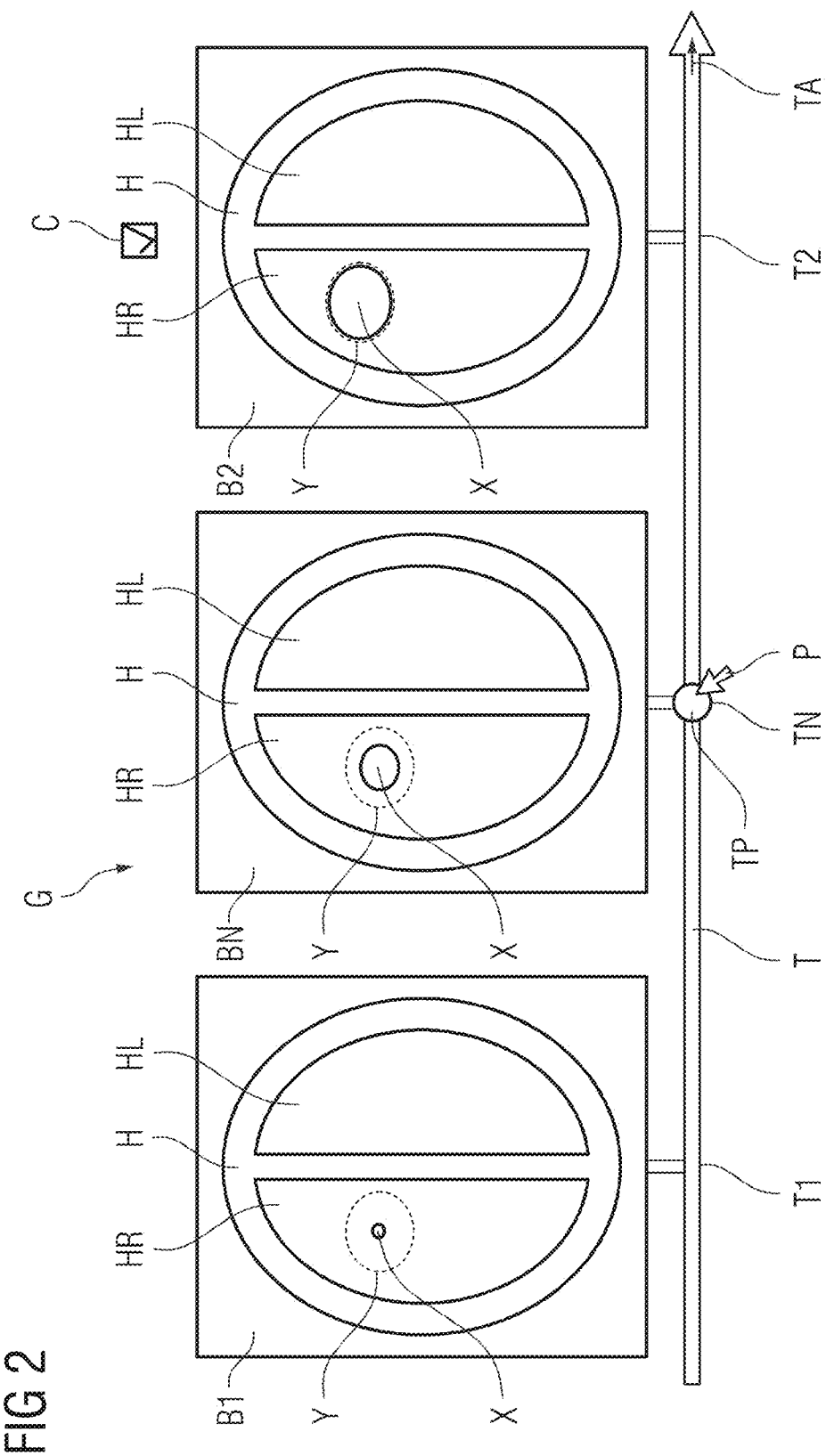
FIG. 2 shows an exemplary display of the stroke information in a graphical user interface.

FIG. 2 shows an exemplary display of the stroke information in a graphical user interface G. The examination area comprises the brain H with the left cerebral hemisphere HL and the right cerebral hemi-sphere HR. Counterfactual images for different points in time may be generated interactively by dragging the slider element TP with the pointer P to the respective point on the time axis T. The arrow TA indicates the direction towards increasing time.

The first value for the first variable is a first time point T1 after an onset of the stroke. The second value for the first variable is a second time point T2 after the onset of the stroke. The first counterfactual medical image B1 of the examination area of the patient is generated by applying the adjusted causal model onto the first value for the first variable in form of the first time point T1. The stroke information comprises the first counterfactual medical image B1 and is generated based on the first counterfactual medical image B1. A second value for the first variable and/or a second value for the second variable is received, wherein a second counterfactual medical image B2 of the examination area of the patient is generated by applying the adjusted causal model onto the second value for the first variable in form of the second time point T2. The stroke information comprises the second counterfactual medical image B2 and is generated further based on the second counterfactual medical image B2.

The first counterfactual image B1 and the second counterfactual image B2, one prior to and one later than the current scan, are shown. B1 represents the estimated appearance at 4 hours after the onset of the stroke. B2 represents the predicted appearance at 8 hours after the onset of the stroke. BN represents the appearance of the examination region in the examination data. The estimated time TN that elapsed between the onset time of the stroke and the acquisition of the examination data is 6 hours.

Similarly, such images could be arranged on a timeline for non-interactive viewing. Using the image B2 as the baseline for a difference computation, as indicated by the checkbox C, the future extent Y of the infarction X is displayed as an overlay in the other images.

Figure 3:
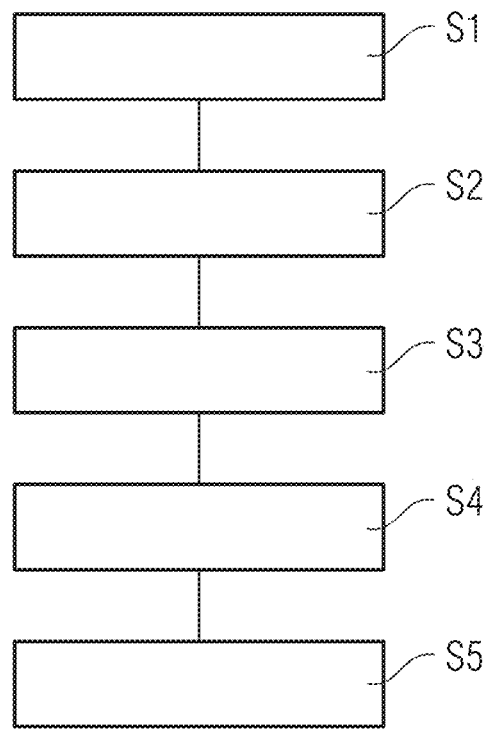
FIG. 3 shows a flow chart for a computer-implemented method for providing a stroke information according to one or more example embodiments.

FIG. 3 shows a flow chart for a computer-implemented method for providing a stroke information, the method comprising:
  Receiving S1 examination data, the examination data comprising computed tomography imaging data of an examination area of a patient, the examination area of the patient comprising at least one brain region, the at least one brain region being affected by a stroke,
  Adjusting S2 a causal model based on the computed tomography imaging data, thereby obtaining an adjusted causal model, wherein the adjusted causal model models a first variable as a first cause for an appearance of the examination area of the patient,
  Receiving S3 a first value for the first variable,
  Generating S4 the stroke information based on the adjusted causal model and the first value for the first variable,
  Providing S5 the stroke information.

Figure 4:
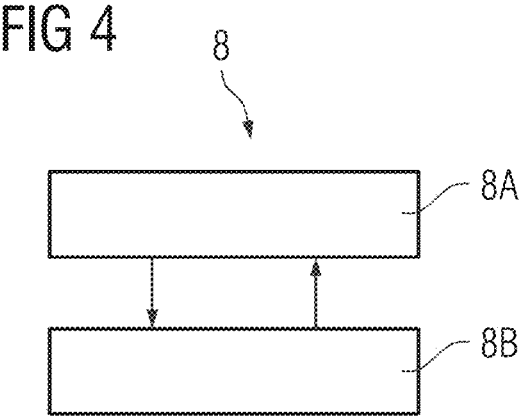
FIG. 4 shows a data processing system according to one or more example embodiments.

FIG. 4 shows a data processing system 8 comprising a data interface 8A and a processor 8B, the data processing system 8 being configured for carrying out a method as described with respect to FIG. 3. For example, the processor 8B is configured to execute computer-readable instructions to cause the data processing system 8 to perform the method of FIG. 3. The processor 8B may store the computer-readable instructions on the data processing system 8 may further include a memory from which the processor 8B retrieves the computer-readable instructions.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

The interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

When a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Wherever meaningful, individual embodiments or their individual aspects and features can be combined or exchanged with one another without limiting or widening the scope of the present invention. Advantages which are described with respect to one embodiment of the present invention are, wherever applicable, also advantageous to other embodiments of the present invention.

The invention claimed is:

1. A computer-implemented method for providing a stroke information, the method comprising:
   receiving examination data, the examination data comprising computed tomography imaging data of an examination area of a patient, the examination area of the patient comprising at least one brain region, the at least one brain region being affected by a stroke;
   adjusting a causal model based on the computed tomography imaging data to obtain an adjusted causal model, wherein the adjusted causal model models a first variable as a first cause for an appearance of the examination area of the patient;
   receiving a first value for the first variable;
   generating the stroke information based on the adjusted causal model and the first value for the first variable; and
   providing the stroke information.

2. The method of claim 1, wherein the first variable is a time information regarding an onset time of the stroke.

3. The method of claim 1, wherein
   the adjusted causal model models a second variable as a second cause for the appearance of the examination area of the patient,
   the second variable includes demographic information regarding the patient, non-imaging-based diagnostic information regarding the patient, medical image information, therapeutic information regarding a therapy of the stroke, a subcombination thereof or a combination thereof,
   the receiving receives a first value for the second variable, and
   the generating generates the stroke information further based on the first value for the second variable.

4. The method of claim 3, further comprising:
   generating a first counterfactual medical image of the examination area of the patient by applying the adjusted causal model onto the first value for the first variable, wherein at least one of,
   the stroke information includes the first counterfactual medical image, or
   the generating the stroke information generates the stroke information based on the first counterfactual medical image.

5. The method of claim 4, wherein the receiving receives at least one of a second value for the first variable or a second value for the second variable and the method further comprises:
   generating a second counterfactual medical image of the examination area of the patient by applying the adjusted causal model onto at least one of the second value for the first variable or the second value for the second variable, wherein at least one of,
   the stroke information includes the second counterfactual medical image, or
   the generating the stroke information generates the stroke information further based on the second counterfactual medical image.

6. The method of claim 5, further comprising:
   calculating a difference map based on the first counterfactual medical image and the second counterfactual medical image, wherein at least one of,
   the stroke information includes the difference map, or
   the generating the stroke information generates the stroke information further based on the difference map.

7. The method of claim 5, wherein the examination data comprise an actual medical image of the examination area of the patient and the method further comprises:
   determining an estimated value for the first variable based on the first value for the first variable, the second value for the first variable, the first counterfactual medical image, the second counterfactual medical image and the actual medical image, wherein at least one of,
   the stroke information includes the estimated value for the first variable, or
   the generating the stroke information generates the stroke information further based on the estimated value for the first variable.

8. The method of claim 5, wherein at least one of,
   the first value for the first variable is a first time point after an onset of the stroke, or
   the second value for the first variable is a second time point after the onset of the stroke.

9. The method of claim 3, wherein the adjusted causal model models an image-derived information as an effect of the first variable and as an intermediate cause for the appearance of the examination area of the patient and the method further comprises:
   calculating a value for the image-derived information by applying the adjusted causal model onto the first value for the first variable, wherein
   the generating the stroke information generates the stroke information further based on the value for the image-derived information.

10. The method of claim 9, wherein
    the adjusted causal model models the first variable as the first cause for the appearance of the examination area of the patient according to a first medical imaging technique, and
    the adjusted causal model models the appearance of the examination area of the patient according to the first medical imaging technique as a cause for the appearance of the examination area of the patient according to a second medical imaging technique.

11. The method of claim 10, further comprising:
    generating a first counterfactual medical image of the examination area of the patient by applying the adjusted causal model onto the first value for the first variable, wherein at least one of,
the stroke information includes the first counterfactual medical image, or
the generating the stroke information generates the stroke information based on the first counterfactual medical image.

12. The method of claim 11, wherein the receiving receives at least one of a second value for the first variable or a second value for the second variable and the method further comprises:
generating a second counterfactual medical image of the examination area of the patient by applying the adjusted causal model onto at least one of the second value for the first variable or the second value for the second variable, wherein at least one of,
the stroke information includes the second counterfactual medical image, or
the generating the stroke information generates the stroke information further based on the second counterfactual medical image.

13. The method of claim 12, wherein at least one of,
the first value for the first variable is a first time point after an onset of the stroke, or
the second value for the first variable is a second time point after the onset of the stroke.

14. The method of claim 1, wherein the adjusted causal model models an image-derived information as an effect of the first variable and as an intermediate cause for the appearance of the examination area of the patient and the method further comprises:
calculating a value for the image-derived information by applying the adjusted causal model onto the first value for the first variable, wherein
the generating the stroke information generates the stroke information further based on the value for the image-derived information.

15. The method of claim 1, wherein
the adjusted causal model models the first variable as the first cause for the appearance of the examination area of the patient according to a first medical imaging technique, and
the adjusted causal model models the appearance of the examination area of the patient according to the first medical imaging technique as a cause for the appearance of the examination area of the patient according to a second medical imaging technique.

16. The method of claim 1, wherein the causal model is a deep structural causal model.

17. The method of claim 1, wherein the causal model is based on a plurality of training datasets, each training dataset of the plurality of training datasets comprising computed tomography stroke imaging data and a respective value for the first variable.

18. A data processing system, comprising:
a data interface; and
a processor, the data processing system being configured to perform the method of claim 1.

19. A computed tomography device comprising:
the data processing system of claim 18, wherein the computed tomography device is configured to acquire the computed tomography imaging data of the examination area of the patient.

20. A non-transitory computer-readable storage medium, comprising instructions including instructions which, when executed by a computer, cause the computer to perform the method of claim 1.

* * * * *